United States Patent
Morikawa

[19]

[11] Patent Number: 5,867,565
[45] Date of Patent: Feb. 2, 1999

[54] INTELLIGENT NETWORK HAVING SERVICE CONTROL NODE AND SERVICE SWITCHING NODE FOR ACHIEVING TRAFFIC DATA COLLECTION PROCESSING

[75] Inventor: Toshihiro Morikawa, Hakata, Japan

[73] Assignee: Fujitsu Limited, Kanagawa, Japan

[21] Appl. No.: 618,212

[22] Filed: Mar. 19, 1996

[30] Foreign Application Priority Data

Jul. 17, 1995 [JP] Japan ................................ 7-180244

[51] Int. Cl.⁶ .................................................. H04M 15/00
[52] U.S. Cl. ........................ 379/113; 379/111; 379/133; 379/207; 379/230
[58] Field of Search ................................... 379/220, 230, 379/111, 201, 207, 112, 113, 120, 133, 197, 219, 243

[56] References Cited

U.S. PATENT DOCUMENTS

| | | | |
|---|---|---|---|
| 5,353,339 | 10/1994 | Scobee | 379/207 |
| 5,386,467 | 1/1995 | Ahmqd | 379/220 |
| 5,408,518 | 4/1995 | Yunoki | 379/207 |
| 5,418,844 | 5/1995 | Morrisey et al. | 379/230 |
| 5,422,940 | 6/1995 | Endo et al. | 379/207 |
| 5,425,086 | 6/1995 | Hidaka et al. | 379/220 |
| 5,434,914 | 7/1995 | Fraser | 379/207 |
| 5,448,632 | 9/1995 | Iyob et al. | 379/112 |
| 5,448,633 | 9/1995 | Jamaleddin et al. | 379/201 |
| 5,481,603 | 1/1996 | Guttierrez et al. | 379/221 |
| 5,499,290 | 3/1996 | Koster | 379/242 |
| 5,506,893 | 4/1996 | Buscher et al. | 379/114 |
| 5,511,113 | 4/1996 | Tasaki et al. | 379/112 |
| 5,517,562 | 5/1996 | McConnell | 379/207 |
| 5,526,413 | 6/1996 | Cheston, III et al. | 379/201 |
| 5,526,415 | 6/1996 | Wakamoto | 379/230 |
| 5,546,450 | 8/1996 | Suthard et al. | 379/12 |
| 5,566,235 | 10/1996 | Hetz | 379/201 |
| 5,570,410 | 10/1996 | Hooshiari | 379/32 |
| 5,572,583 | 11/1996 | Wheeler, Jr. et al. | 379/207 |
| 5,581,610 | 12/1996 | Hooshiari | 379/133 |
| 5,581,611 | 12/1996 | Yunoki | 379/211 |
| 5,633,921 | 5/1997 | Soderberg | 379/207 |

(List continued on next page.)

FOREIGN PATENT DOCUMENTS 6113009  4/1994  Japan .

OTHER PUBLICATIONS

BERGER AND GIBBONS, "New Customer–defined network service", AT&T Bell Laboratories, pp. 50–60, Mar. 1, 1986.

BAUER, KULZER AND SABLE, "Designing Service–Independent Capabilities for Intelligent Networks", IEEE COmmunications Manager, pp. 31–41., Dec. 1, 1988.

PENNANECH "Intelligent Network Software Factory for Serrvice Creation and Modification", Alcatel CIT, Jan. 1, 1989.

DUNOGUE, KERIHUEL AND MARTIN "The Building of Intelligent Networks–Architectuire and Systems from Alcatel", Alcatel, pp. 5–22., Jun. 6, 1989.

MELLOR "Customer Managed Communications–British Telecom's Approach to Open Integrated Network Management", British Telecom, pp. 38–54., Apr. 1, 1998.

*Primary Examiner*—Curtis A. Kuntz
*Assistant Examiner*—Rexford N. Barnie
*Attorney, Agent, or Firm*—Helfgott & Karas, PC.

[57] ABSTRACT

A communication network having intelligent network functions which collects traffic data for call services without requiring alteration of or addition to programs in all of the service switching nodes in the communication network even if a new call service is introduced as an intelligent network service. For this reason, a service control node (SCN) has a unit assigning a call service identification information (ID) to a new call service and the service switching node provides a registration table receiving the identification information (ID) and registering the same in it. If a call service requested by the calling party is in the registration table, the traffic data is collected for the call service.

13 Claims, 19 Drawing Sheets

U.S. PATENT DOCUMENTS

| | | | |
|---|---|---|---|
| 5,640,446 | 6/1997 | Everrett et al. | 379/115 |
| 5,657,383 | 8/1997 | Gerber et al. | 379/266 |
| 5,664,102 | 9/1997 | Faynberg | 379/200.76 |
| 5,675,638 | 10/1997 | Ogasawara et al. | 379/200 |
| 5,694,463 | 12/1997 | Christie et al. | 379/230 |
| 5,703,940 | 12/1997 | Sattar et al. | 379/201 |
| 5,708,702 | 1/1998 | De Paul et al. | 379/207 |
| 5,732,130 | 3/1998 | Iaplucci et al. | 379/207 |
| 5,754,632 | 5/1998 | Smiath | 379/114 |

Fig. 9

| | 31 | 30 | 29 | 28 | 27 | 26 | 25 | 24 | 23 | 22 | 21 | 20 | 19 | 18 | 17 | 16 *4 |
|---|---|---|---|---|---|---|---|---|---|---|---|---|---|---|---|---|
| 0 | | A31 | A30 | A29 | A28 | A27 | A26 | A25 | A24 | A23 | A22 | A21 | A20 | A19 | A18 | A17 |
| 1 | D | E | | | | | | | | | | | | | | |
| 2 | C7 | | | | | | | C6 | | | | | C5 | | | C4 |
| 3 | C15 | | | | | | | C14 | | | | | C13 | | | C12 |
| 4 | C23 | | | | | | | C22 | | | | | C21 | | | C20 |
| 5 | C31 | | | | | | | C30 | | | | | C29 | | | C28 |

[TRAFFIC INFO. 1]
TRAFFIC DATA
COLLECTION
INSTRUCTION

Fig. 10

[TRAFFIC INFO. 1]
TRAFFIC DATA
COLLECTION
INSTRUCTION

| *4 | | | | | | | | | | | | | | | | | 0 | 1 | 2 | 3 | 4 | 5 |
|---|---|---|---|---|---|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 | | | | | | |
| | A16 | A15 | A14 | A13 | A12 | A11 | A10 | A9 | A8 | A7 | A6 | A5 | A4 | A3 | A2 | A1 | | C0 | C1 | C2 | C3 | |
| | | | | | | | | | | | | | | | | | | C8 | C9 | C10 | C11 | |
| | | | | | | | | | | | | | | | | | | C16 | C17 | C18 | C19 | |
| | | | | | | | | | | | | | | | | | | C24 | C25 | C26 | C27 | |

Fig.13

[TRAFFIC INFO.3]
TRAFFIC
TRANSMISSION
DATA

INF

INTELLIGENT NETWORK HAVING SERVICE CONTROL NODE AND SERVICE SWITCHING NODE FOR ACHIEVING TRAFFIC DATA COLLECTION PROCESSING

BACKGROUND OF THE INVENTION

1. Field of the Invention

The present invention relates to an intelligent network having service control nodes (SCN) and service switching nodes (SSN) for collecting traffic data.

In recent years, communication networks provided with intelligent network (IN) functions have been put into operation. These communication networks provided with intelligent network functions are mainly constituted by service switching nodes (generally switching offices) having a large number of subscriber terminals under them and service control nodes which are connected to the service switching nodes via the communication networks and provide intelligent network services (IN services). To these communication networks are also connected central maintenance operation centers (CMOCs) which monitor the intelligent network services etc. The intelligent network services referred to here include a variety of call services such as for example a credit card calling service and free dial service. The credit card calling service enables the cost of a call to be charged not to the calling subscriber terminal, but to a calling subscriber per se. Also, the free dial service enables the cost of a call to be charged not to the calling subscriber terminal, but to called subscriber terminal.

Note that the intelligent network services are provided whenever there is a request from the calling subscriber terminal. Access for starting the call service is carried out from the related service switching node (switching office) via the communication network for the service control node in response to this request.

The "collection of traffic data" as referred to in the present invention and explained in detail later means the processing of traffic data of the call service (call service requested from the calling subscriber terminal among the intelligent network services), for example, data concerning a number of times of utilization thereof, utilization time, usage date and time, whether or not the utilization was successful, etc. for collection by the related service switching node and the collection of the results thereof by the service control node.

2. Description of the Related Art

As will be explained in detail later by referring to the drawings, in the past, the processing for collection of traffic data on calls handled at the switching offices has been performed by the software installed in those switching offices. Accordingly, when newly introducing a call control service, it has been necessary to alter and add to the software for the processing for collection of the traffic data as well. In this case, it has been necessary to individually update and add to the software of all of the switching offices collecting traffic data.

On the other hand, communication networks provided with intelligent network functions to which the present invention is applied have adopted an architecture where the service switching nodes execute the prescribed switching operation and the service control nodes operate to control the intelligent network services. Accordingly, so long as there is no change in the switching operation of the service switching nodes, even if an intelligent network service is newly introduced, in principle, it can be handled by just replacement of the files of the service control nodes, and there is no replacement of the files of the service switching nodes.

Therefore, as a countermeasure for when introducing such a new intelligent network service, it can be considered to collect the traffic data not by the service switching nodes, but by the service control nodes. However, it is necessary to note that it is extremely difficult to collect all traffic data by service control nodes, that any software resources for the processing for collection of traffic data individually developed by the service switching nodes must be used in common among a large number of service switching nodes, and that, further, the load required for the processing for collection of traffic data must be shared among a large number of service switching nodes.

Under such circumstances, it is uneconomical to have the processing for collection of all traffic data be carried out in the service control nodes as in the above countermeasure, and thus the processing for collection of the traffic data must be carried out on the service switching node side as well. This being the case, when newly introducing an intelligent network service into the intelligent network communication network, it is necessary to replace the files with files modified for the new intelligent network service and to alter and add software for the processing for collection of the traffic data of the intelligent network service not only in the service control nodes, but also in all service switching nodes. This being the case, there is the problem that this runs contrary to the principle of not replacing files of the service switching nodes.

In addition, the replacement of files generally involves an enormous number of steps and cost, and thus there arises the problem that such forcible replacement of files for each of a large number of service switching nodes whenever newly introducing an intelligent network service is extremely uneconomical for a communication network as a whole.

SUMMARY OF THE INVENTION

Accordingly, in consideration of the above problem, an object of the present invention is to perform the alteration and addition of software for dealing with introduction of any new intelligent network service only at the service control nodes when it occurs and to completely eliminate the necessity for the alteration and addition of software concerning the processing for collection of traffic data for coping with the newly introduced service in the service switching nodes.

To attain the above object, the present invention is configured so that the service control nodes are provided with means for assigning call service identification information (ID) to a new call service and so that the service switching nodes are provided with registration tables for receiving the identification information (ID) and registering the same in it. If a call service requested by the calling party exists in the registration table, the traffic data is collected for that call service. Thus, in a communication network provided with intelligent network functions, even if a new call service is newly introduced as an intelligent network service, the traffic data for the call service can be collected without accompanying alteration and addition of programs in the service switching nodes in the communication network.

BRIEF DESCRIPTION OF THE DRAWINGS

The above object and features of the present invention will be more apparent from the following description of the preferred embodiments with reference to the accompanying drawings, wherein:

FIG. 9 is a first part of a view showing an example of the data format of a signal transferred on F1 of FIG. 4;

FIG. 10 is a second part of a view showing an example of the data format of a signal transferred on F1 of FIG. 4;

FIG. 13 is a first part of a view showing an example of the data format of a signal transferred on F3 of FIG. 5;

DESCRIPTION OF THE PREFERRED EMBODIMENTS

Before describing the embodiments of the present invention, the related art and the disadvantages therein will be described with reference to the related figures.

Figure 18:
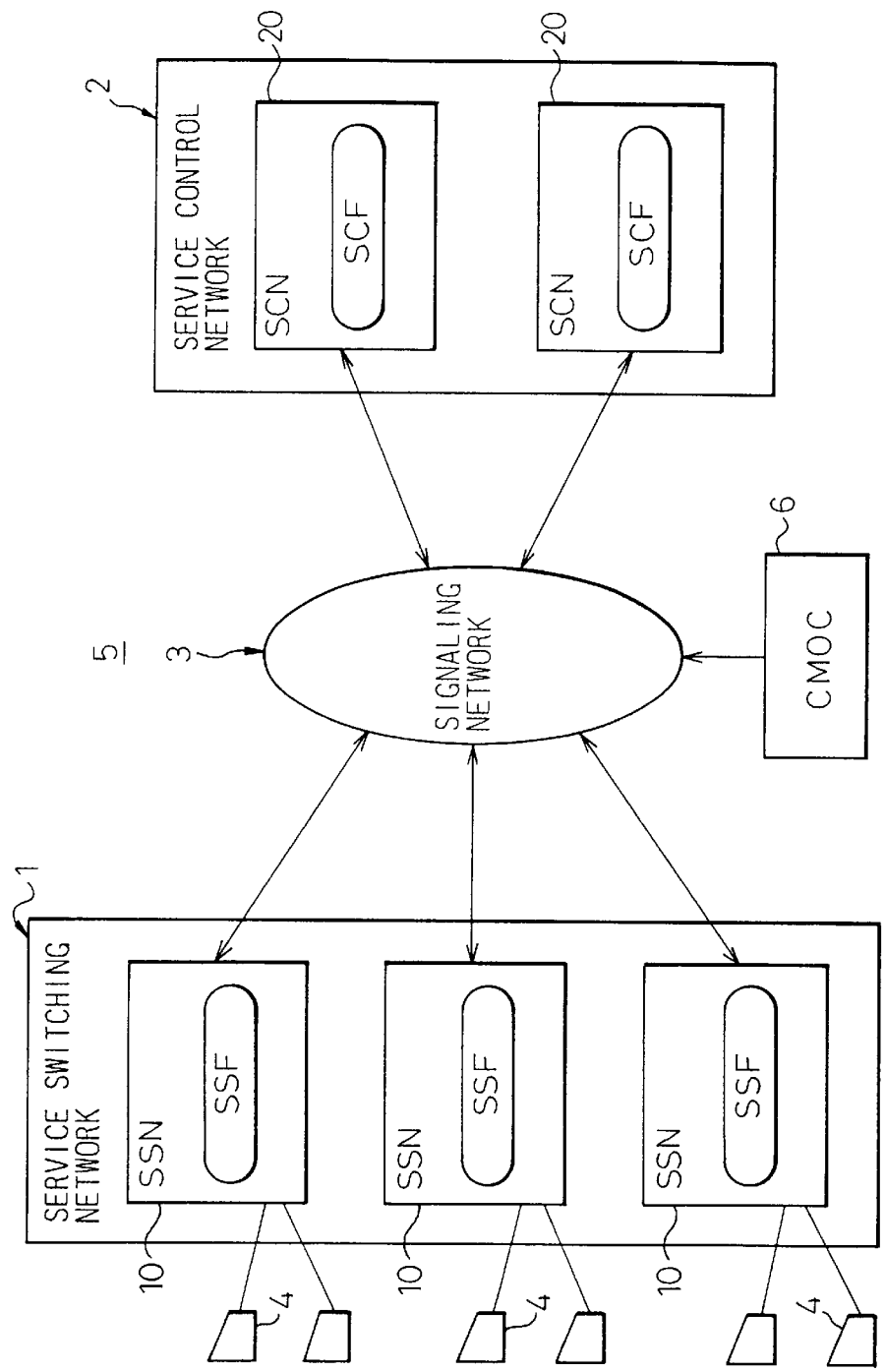
FIG. 18 is a view showing an example of the configuration of a communication network having intelligent network functions to which the present invention is applied.

FIG. 18 is a view showing an example of the configuration of a communication network provided with intelligent network functions to which the present invention is applied. In the figure, the overall general configuration is mainly that of a service switching network 1, a service control network 2, and a signaling network 3 connecting them. Further provision is made of a central maintenance operation center (CMOC) for supervising the entire whole communication network 5.

The service switching network 1 includes at least one service switching node (SSN) 10 and forms speech paths among a large number of subscriber terminals 4. Each service switching node 10 is provided with service switching functions (SSF).

The service control network 2 includes at least one service control node (SCN) 20 and executes the intelligent network services. Each service control node 20 is provided with service control functions (SCF).

Figure 19:
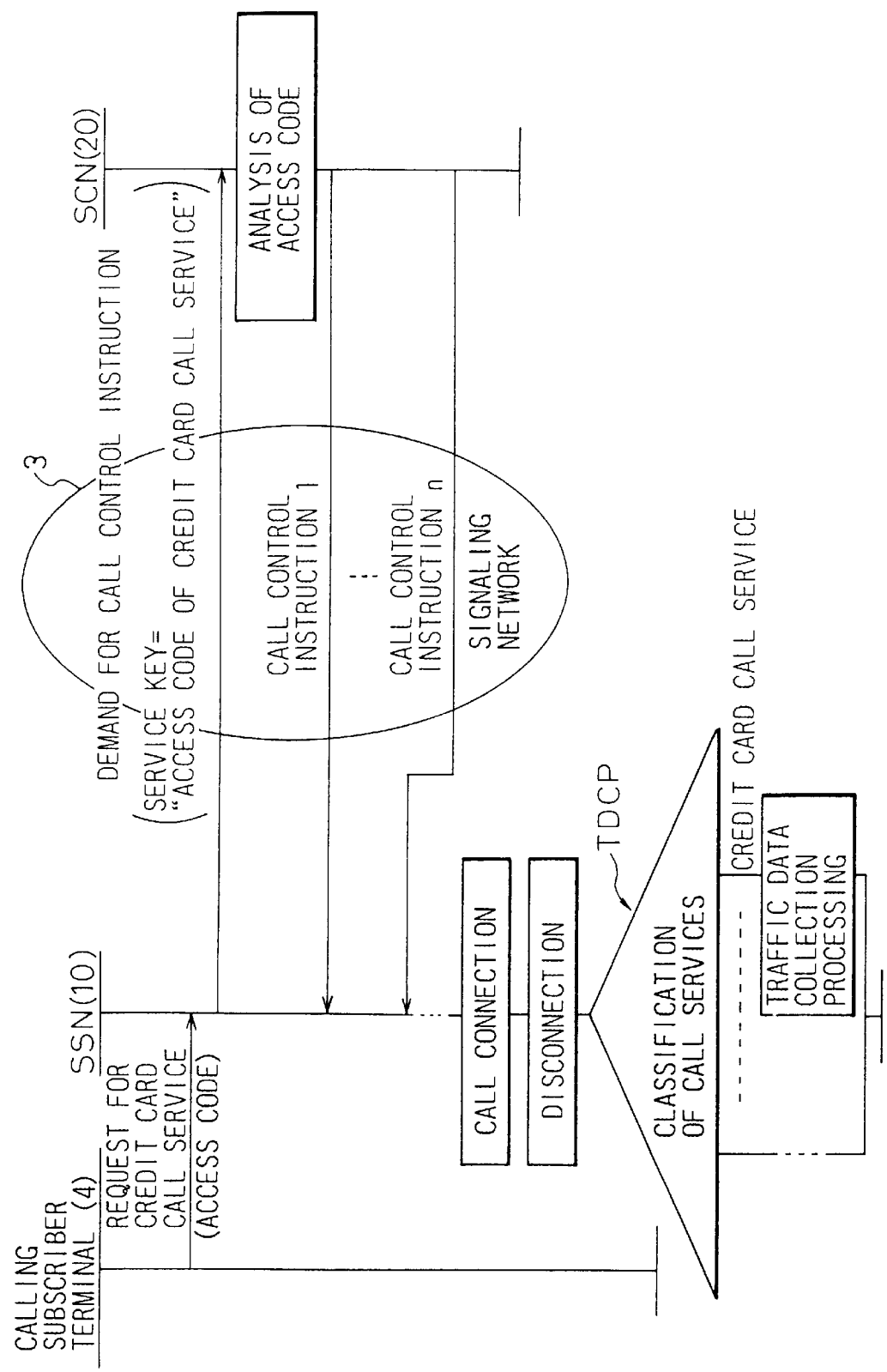
FIG. 19 is a view showing the operation for collecting traffic data in a conventional communication network having intelligent network functions.

FIG. 19 is a view for explaining the conventional operation for collecting traffic data in a communication network having intelligent network functions. In the figure, one service switching node 10 and one service control node 20 are connected via a central signaling network 3. For simplification, a view is shown where one calling subscriber terminal 4 is accommodated in the service switching node 10.

The service switching node 10 receives instructions for a series of call control operations for controlling the intelligent network services from the service control node 20 and carries out operations such as call connection, disconnection, release, etc. On the other hand, the service control node 20 provides instructions for a series of call control operations such as connection, disconnection, release, etc. of the control of the intelligent network services to the service switching node 10.

Assume here that a credit card calling service, which is one of the intelligent network services, is requested to the service switching node 10 from the calling subscriber terminal 4 as an example. At this time, an access code for identifying the related call service is also transferred.

The service switching node 10 which receives the request for the credit card calling service together with the access code, demands the receipt of call control instructions from the service control node 20. The service key at this time is an access code representing the credit card calling service.

Receiving this, the service control node 20 analyzes the related access code and provides instructions for call control in accordance with this analysis to the service control node 20 a plurality of times (1 . . . n). The service control node 20 operates according to these call control instructions and performs "call connection".

When the speech of that call ends, the service switching node 10 enters into a disconnection operation "DISCONNECTION" and ends that call. At the time of the end of this call, the service switching node 10 executes processing for collection of traffic data (TDCP or "TRAFFIC DATA COLLECTION PROCESSING" in the figure) for the intelligent network service which is being provided for the calling subscriber (4).

A first step of this traffic data collection processing is to confirm which among a variety of types of intelligent network services is the now provided call service ("CALL SERVICE CLASSIFICATION"). Then, in the second step, the processing for the traffic data collection ("TRAFFIC DATA COLLECTION PROCESSING") is carried out for the now provided call service (=credit card calling service).

In general, in a switching office having a traffic data collection processing function, the traffic data of that switching office which is collected and processed includes, other than the calling services, the traffic data for every classification such as destinations (showing the switching destination office of the direct out dial (DOD) and direct in dial (DID)) and routes. These traffic data are collected and edited by software by a processor of the switching office whenever a call ends and are stored in a memory medium such as a file memory (FM) or hard disk (HDK).

As already mentioned, in the past, the processing for collection of traffic data on calls handled at the switching offices has been performed by the software installed in those switching offices. Accordingly, when newly introducing a call control service, it has been necessary to alter and add to the software for the processing for collection of the traffic data as well. In this case, it has been necessary to individually update and add to the software of all of the switching offices collecting traffic data.

On the other hand, communication networks 5 provided with intelligent network functions to which the present invention is applied have adopted an architecture where the service switching nodes 10 execute the prescribed switching operation and the service control nodes 20 operate to control the intelligent network services. Accordingly, so long as there is no change in the switching operation of the service switching nodes 10, even if an intelligent network service is newly introduced, in principle, it can be handled by just replacement of the files of the service control nodes 20, and there is no replacement of the files of the service switching nodes 10.

Therefore, as a countermeasure for when introducing such a new intelligent network service, it can be considered to collect the traffic data not by the service switching nodes 10, but by the service control nodes 20. However, it is necessary to note that it is extremely difficult to collect all traffic data by service control nodes 20, that any software resources for the processing for collection of traffic data individually developed by the service switching nodes 10 must be used in common among a large number of service switching nodes 10, and that, further, the load required for the processing for collection of traffic data must be shared among a large number of service switching nodes 10.

Under such circumstances, it is uneconomical to have the processing for collection of all traffic data be carried out in the service control nodes 20 as in the above countermeasure. Thus the processing for collection of the traffic data must be carried out on the service switching node 10 side as well. This being the case, when newly introducing an intelligent network service into the intelligent network communication network, it is necessary to replace the files with files modified for the new intelligent network service and to alter and add software for the processing for collection of the traffic data of the intelligent network service not only in the service control nodes 20, but also in all service switching nodes 10. This being the case, there is the problem that this runs contrary to the principle of not replacing files of the service switching nodes 10.

In addition, the replacement of files generally involves an enormous number of steps and cost, and thus there arises the problem that such forcible replacement of files for each of a large number of service switching nodes 10 whenever newly introducing an intelligent network service is extremely uneconomical for a communication network 5 as a whole.

The present invention performs the alteration and addition of software for dealing with a newly introduced intelligent network service just by the service control nodes 20 when it occurs and completely eliminates the necessity of alteration and addition of software concerning the traffic data collection processing for dealing with the new introduction in the service switching nodes.

Figure 1:
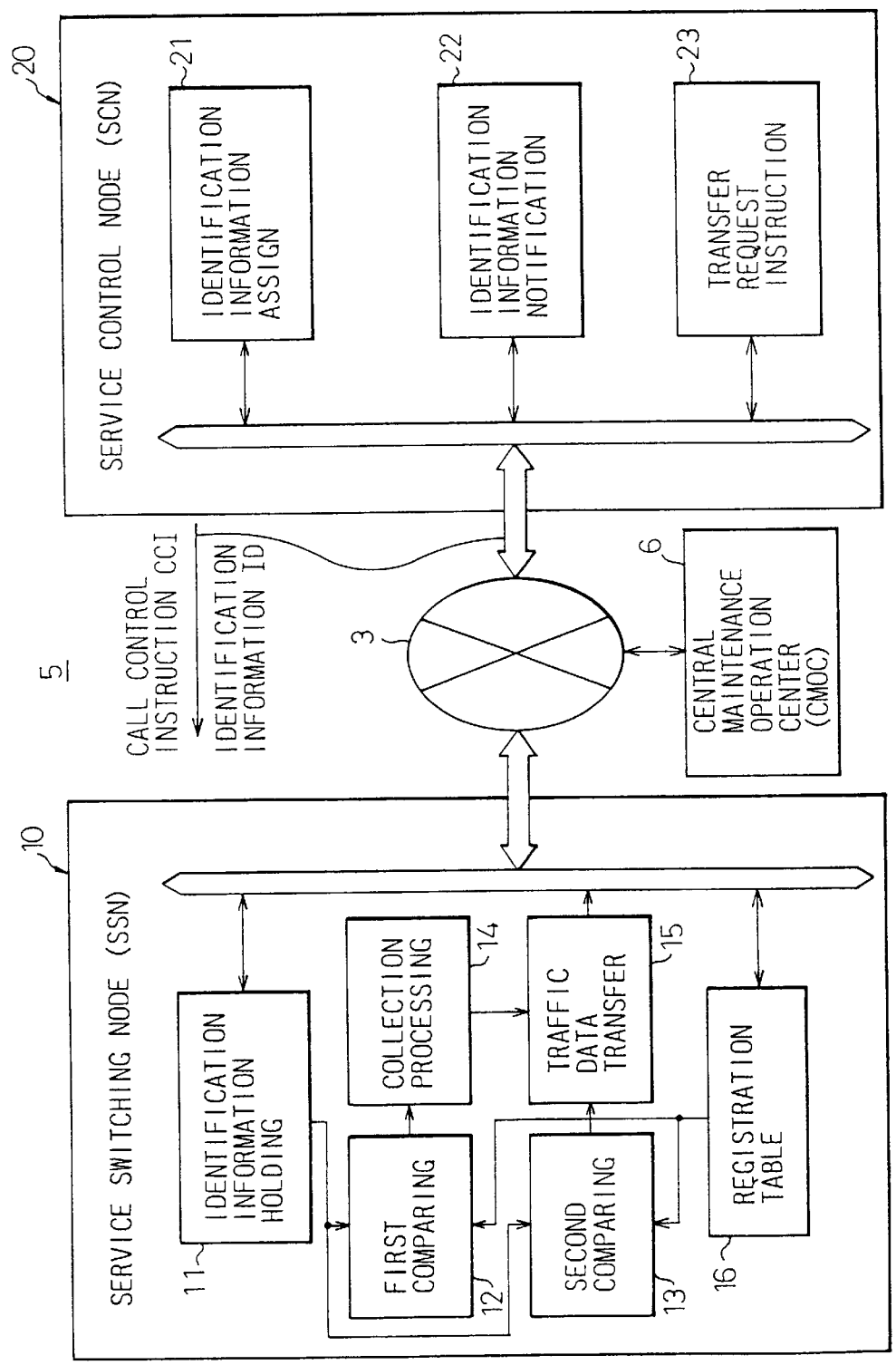
FIG. 1 is a view showing a fundamental configuration of a communication network having intelligent network functions according to the present invention.

FIG. 1 is a view showing a fundamental configuration of a communication network having intelligent network functions according to the present invention. Embodiments of the present invention will be clarified below by referring to this figure.

According to a first aspect of the invention, when viewing the service control node 20 constituting part of the communication network 5 having the intelligent network functions and collecting the traffic data, this service control node 20 is first provided with an identification information assigning means 21 and an identification information notifying means 22.

This identification information assigning means 21 assigns call service identification information ID for each of a variety of call services provided in the communication network 5.

The identification information notifying means 22 sends the call service identification information corresponding to the call service of a request for collection of traffic data when the related request is generated from the service switching node 10 constituting part of the communication network 5 to the service switching node 10 and starts the related processing for collection of traffic data.

More specifically, the service control node 20 assigns the call service identification information ID to a variety of call services provided in the intelligent network (IN) communication network 5, while the service control node 20, at the time of the generation of a request for collection of traffic data of a certain call service, sends the corresponding call service identification information to the service switching node 10, whereby the request for collection of the traffic data thereof is carried out.

According to a second aspect of the invention, when viewing the service switching node 10 constituting part of the communication network 5 having the intelligent network functions and collecting the traffic data, this service switching node 10 is first provided with an identification information holding means 11, a registration table 16, and a first comparing means 12.

This identification information holding means 11 receives the call service identification information ID assigned to each of the variety of call services provided in this communication network 5 from the service control node 20 constituting part of the communication network 5 for each call and holds it.

The registration table 16 records in advance a variety of call services paired with call service identification information ID.

Further, the first comparing means 12 compares the call service identification information ID held in the identification information holding means 11 and the call service identification information ID registered in the registration table 16 at the time of the end of the call and collects the traffic data when the result of comparison is a match.

More specifically, the service switching node 10 receives the call service identification information ID from the service control node 20 when starting the call control service and stores that call service identification information in the identification information holding means 11 (call control memory) for each call. At the time of the end of the call, it compares the call service identification information given to that call and the call service identification information in the registration table 16 which has been preliminarily sent from the service control node 20 and if the result of the comparison is a match, collects and processes the traffic data concerning that service.

In the final analysis, when introducing a new call service in the intelligent network communication network 5, there is no need for altering and adding to the programs in the service switching node 10 and it is possible to handle the introduction of the new call service just by assigning call service identification information in the service control node 20.

In other words, as shown later in the time sequence of FIG. 4 and FIG. 5, by just initially loading basic functions (programs) into the service switching node 10, no matter what new call service is introduced later, it is only necessary to assign call service identification information ID by the service control node 20 and record the information of the call service corresponding to this ID in the service switching node 10. There is no need to replace files in the service switching node 10.

According to a third aspect of the invention, the service switching node 10 has a collection processing means 14, which means 14 is started when the result of comparison by the first comparing means 12 is a match and collects the traffic data for the call service relating to the match.

More specifically, in the service switching node 10, the collection processing means 14 performs the processing for collection of the related traffic data just for the already registered call services via the call service identification information ID.

According to a fourth aspect of the invention, the service control node 20 has a transfer request instruction means 23, which means 23 sends the transfer request instruction for causing transfer of the result of the collection of traffic data performed at the service switching node 10 from the service switching node 10 to the service control node 20 together with the call service identification information ID specifying the call service regarding the related traffic data collection.

More specifically, the transfer request instruction means 23 of the service control node 20 feeds the call service identification information ID to the service switching node 10 so as to take out the result of the collection of traffic data in the service switching node 10.

According to a fifth aspect of the invention, the service switching node 10 further has a second comparing means 13 and a traffic data transferring means 15.

This second comparing means 13 compares the notified call service identification information ID with the call service identification information ID registered in the registration table 16 when a transfer request instruction instructing that the result of the collection of the traffic data performed by the collection processing means 14 be transferred to the service control node 20 is sent together with the call service identification information ID specifying the call service regarding the related collection of traffic data.

The traffic data transferring means 15 is started when the result of comparison by the second comparing means 13 is a match and transfers the result of the collection of traffic data by the collection processing means 14 for the call service relating to the match to the service control node 20.

More specifically, in the service switching node 10, when the call service identification information ID of the fourth aspect of the invention is fed, the result of the collection of the traffic data concerning the call service corresponding to the related ID is transferred to the service control node 20.

According to a sixth aspect of the invention, the traffic data transferring means 15 in the service switching node 10 also transfers the result of the collection of traffic data to the central maintenance operation center 6 constituting part of the communication network 5 together with the call service identification information ID.

More specifically, the result of the collection of the traffic data can be sent not only to the service control node 20, but also to the central maintenance operation center 6 and also it can be used as information for supervising the entire communication network 5. Also in this case, supervision can be carried out according to the classification of the intelligent network service using the call service identification information ID.

According to a seventh aspect of the invention, the call service identification information ID to be transferred from the service control node 20 to the service switching node 10 is transferred while being contained in the call control instruction (CCI) which is transferred for instructing the call control to the service switching node 10 by the service control node 20 as an additional information.

More specifically, the call control instruction (CCI) is an important control signal between the service switching node 10 and the service control node 20. It is effective if the call service identification information ID is transferred while being contained in this call control instruction.

According to an eighth aspect of the invention, the call service identification information ID is composed of a call service identification number for identifying the call service.

More specifically, the data comprising the call service identification information ID is made a number which enables identification of the call service.

According to a ninth aspect of the invention, the call service identification information is composed of:

(1) the above call service identification information and (2) a call service identification character code for providing the classification of the call services as character information on an information display means at the service switching node 10.

More specifically, the call service identification information ID of the eighth aspect of the invention is defined as a character code which enables the identification of the call service in addition to the above number. Due to this, the related call service can be displayed as character information such as "CREDIT CALL SERVICE" on a display of a console in the service switching node 10 or a printer 48 shown in FIG. 3 mentioned later, and the call service now being provided can be easily recognized for each call by the operator.

Next, the signaling network 3 will be viewed. This signaling network 3 is preferably (1) a No. 7 common channel signaling network or (2) a signaling network in which a predetermined communication protocol is set up. There are the following four aspects.

According to a 10th aspect of the invention, the call service identification information ID is transferred from the service control node 20 via the No. 7 common channel signaling network 3.

According to an 11th aspect of the invention, the call service identification information ID is transferred from the service switching node 10 via the No. 7 common channel signaling network 3.

According to a 12th aspect of the invention, the call service identification information ID is transferred from the service control node 20 via the signaling network 3 in which the predetermined communication protocol is set up.

According to a 13th aspect of the invention, the call service identification information ID is transferred from the service switching node 10 via the signaling network 3 in which the predetermined communication protocol is set up.

More specifically, in the 10th to 13th aspects of the invention, as the signaling network 3, it is also possible to use a well known No. 7 signaling network or a predetermined communication protocol, for example X.25 (CCITT Recommendations) and transaction capabilities (TCP). Transaction capabilities are communication protocols defined as a means of communication among nodes of different classifications (for example between the switching office and a database-center).

Figure 2:
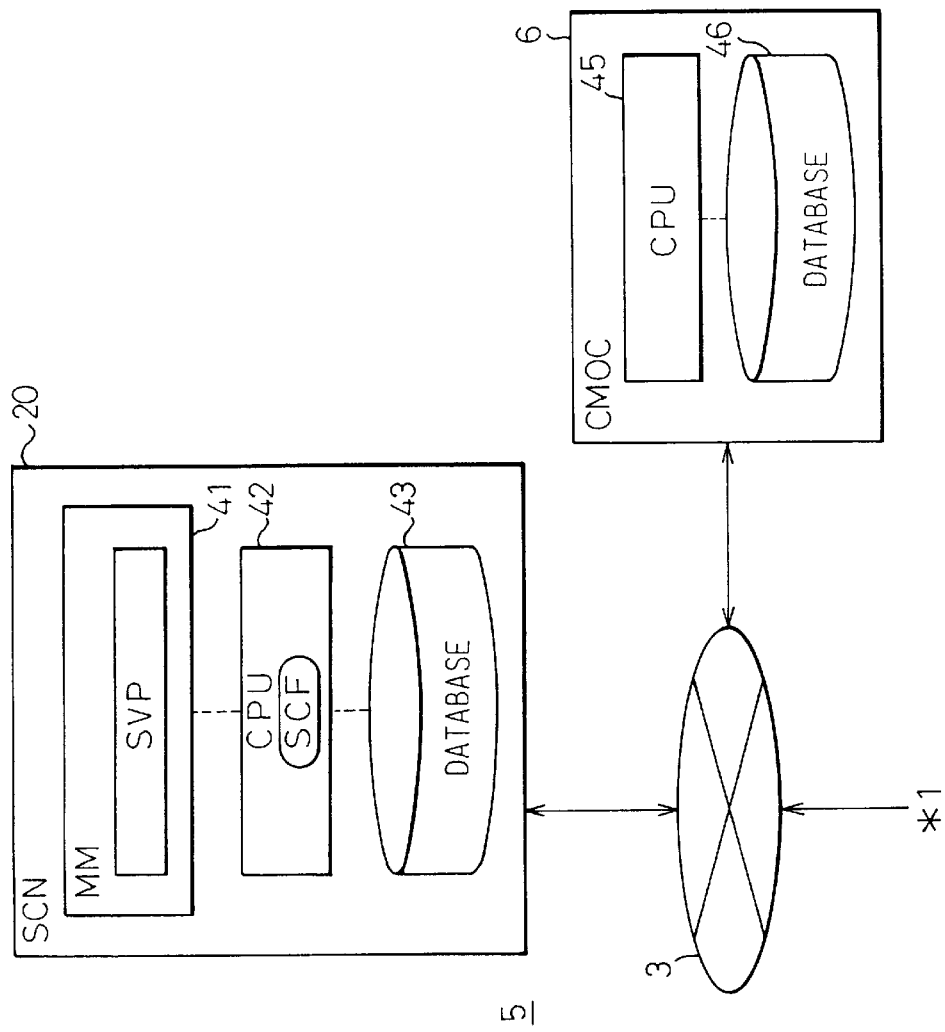
FIG. 2 is a first part of a view showing a concrete example of a communication network having intelligent network functions according to the present invention.
Figure 3:
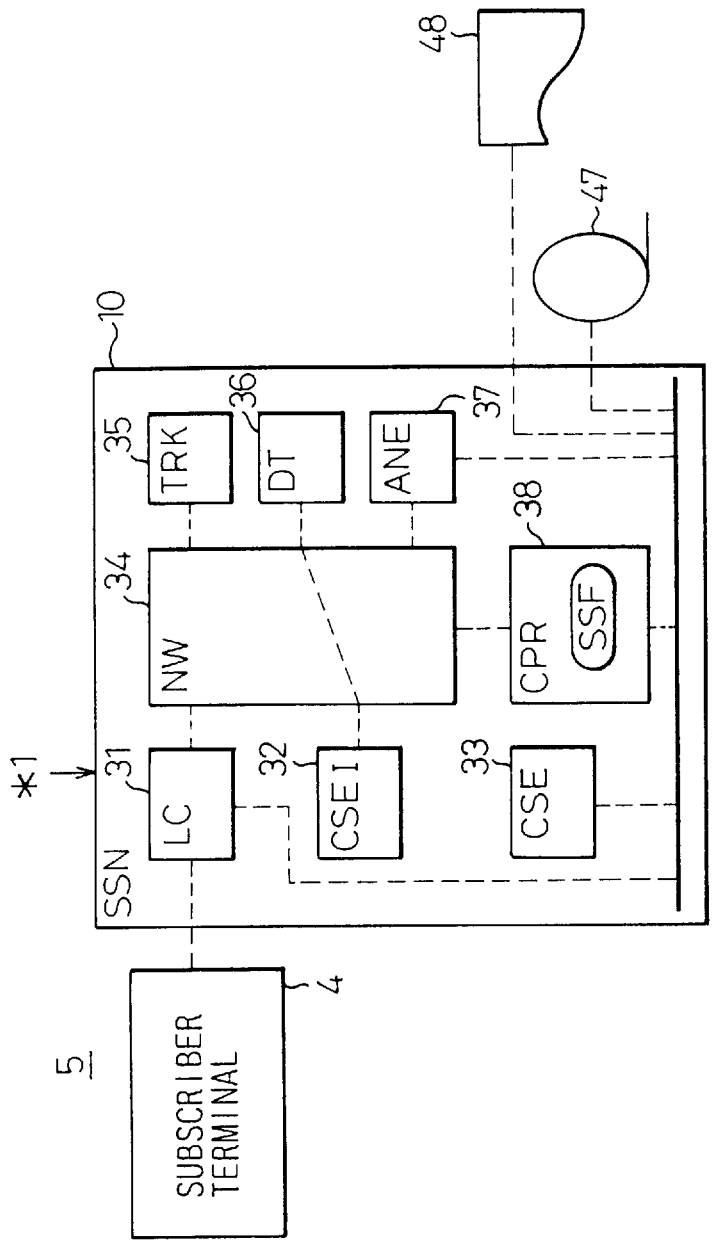
FIG. 3 is a second part of a view showing a concrete example of a communication network having intelligent network functions according to the present invention.

FIG. 2 is a first part of a view showing a concrete example of a communication network having intelligent network functions according to the present invention, while FIG. 3 is a second part of that view. Note, the arrangement of the constituent elements (3, 10, 20) has become different from that of the case of FIG. 1. First, referring to FIG. 3, the service switching node (SSN) 10 is provided with a call processor (CPR) 38 at the center thereof which manages the control of the node as a whole. This call processor 38 carries the service switching functions (SSF) which particularly relate to the present invention.

The call processor 38 has a network switching module (NW) 34 as one of the controlled objects. The network switching module 34 is connected to a subscriber terminal (for example a telephone) 4 via a subscriber line circuit (LC) 31 and is connected to an external signaling network 3 via a trunk (TRK) 35.

To the networking switching module 34, further, a digital terminal (DT) 36 serving as a PCM link interface and a common signaling equipment interface (CSEI) 32 receiving and transmitting common channel signalings are connected. Reference numeral 33 is a common signaling equipment (CSE), and 37 is an announcement equipment for outputting a variety of voice messages.

The traffic data collection processing relating to the present invention is carried out by the call processor 38. The result of that collection is stored in an external storage device such as a magnetic tape (MT) 47, a printer 48, etc.

Next, referring to FIG. 2, the service control node (SCN) 20 comprises a main memory (MM) 41, a central processing unit (CPU) 42, and a database 43. The central processing unit 42 carries the service control functions (SCF) and executes the service control processing and, at the same time, transfers the call service identification information ID relating to the present invention to the service switching node 10. Data necessary for this service control is stored in the database 43.

The main memory 41 stores the service program (SVP).

The central maintenance operation center (CMOC) 6 shown at the right bottom of FIG. 2 comprises a central processing unit (CPU) 45 for supervising the entire communication network 5 and a data base 46 storing the supervising data.

Figure 4:
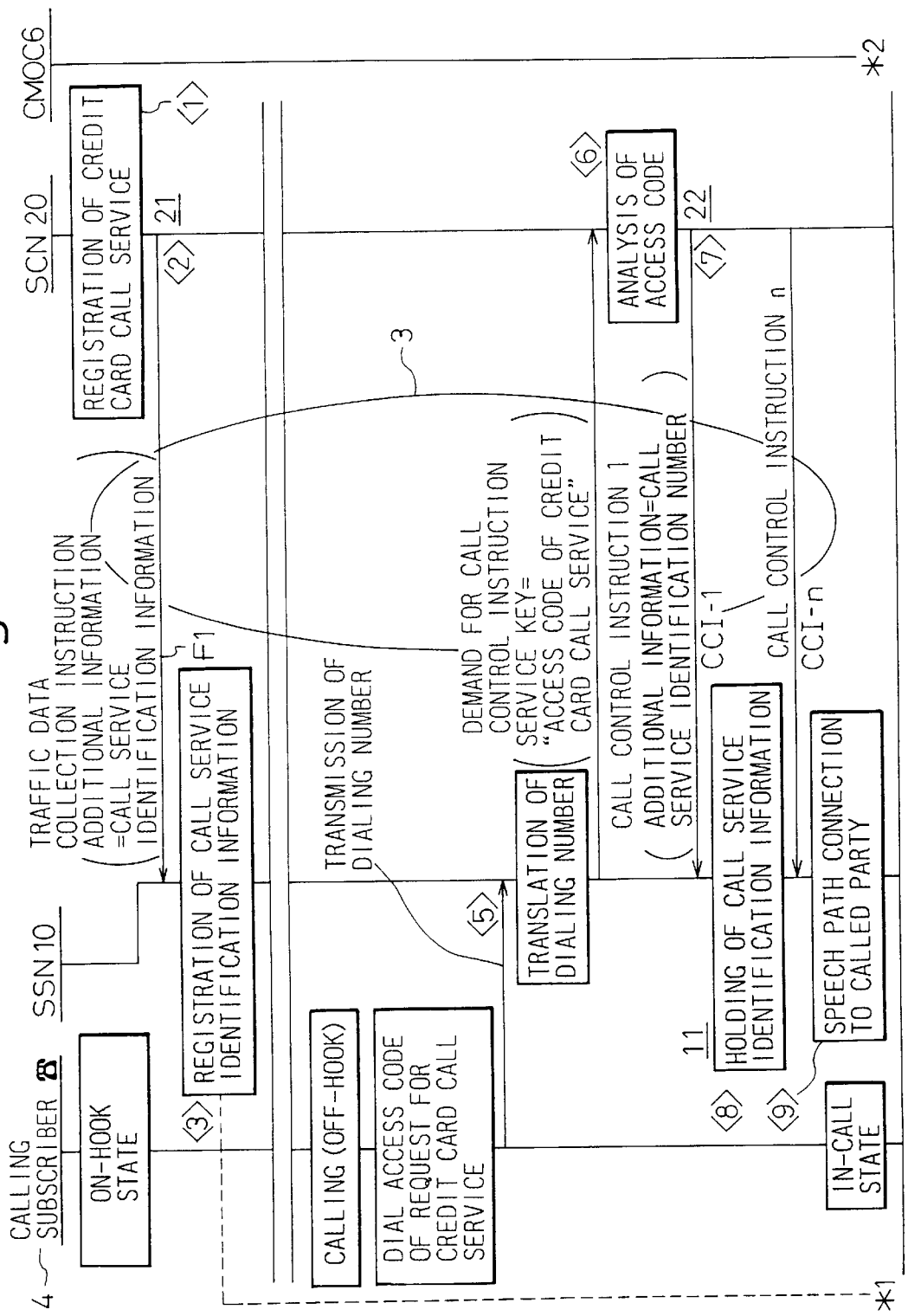
FIG. 4 is a first part of a sequence diagram showing the operation for collection of traffic data according to the present invention.
Figure 5:
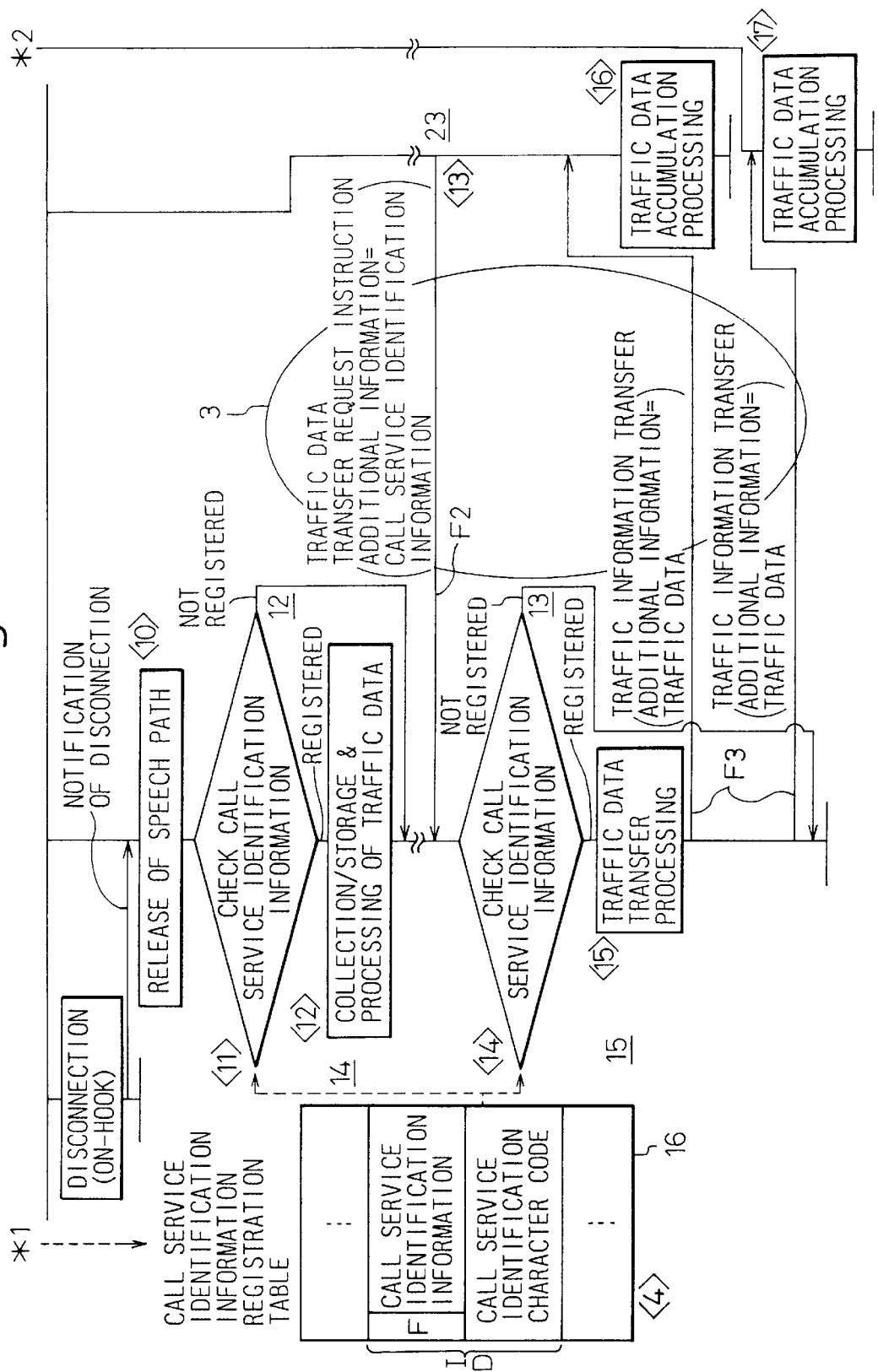
FIG. 5 is a second part of a sequence diagram showing the operation for collection of traffic data according to the present invention.

FIG. 4 is a first part of a sequence diagram showing the operation for collecting traffic data according to the present invention, while FIG. 5 is a second part of that view. In the figures, at the top of FIG. 4, from the left, there are shown the classifications of a calling subscriber terminal 4, a service switching node (SSN) 10, a signaling network (No. 7) 3, a service control node (SCN) 20, and a central maintenance operation center (CMOC) 6.

Also, in the service switching node 10 and service control node 20, the positions of the means particularly relating to the present invention are shown by reference numerals with underlines. It is possible to realize the various types of means 11 to 16 and 21 to 23 shown in FIG. 1 by hardware, but it is also possible to realize the same by software by a central processing unit 42 of FIG. 2 or a call processor 38 of FIG. 3. FIG. 4 and FIG. 5 show a case where these means are realized by software and therefore the corresponding positions in these FIG. 4 and FIG. 5 are indicated by mere reference numerals.

In service switching node 10, the identification information holding unit 11, first comparing unit 12, second comparing unit 13, collection processing unit 14, traffic data transferring means 15, and the registration table 16 act at the respectively illustrated positions. In the service control node 20, the identification information assigning means 21, identification information notifying means 22, and a transfer request instruction means 23 act at the illustrated positions.

At <1>, in the intelligent network (IN) communication network 5, when a "credit card calling service" is introduced as a new intelligent network service, this is recorded in the service control node 20.

At <2>, a unique call service identification information ID allotted to the credit card calling service is assigned by the means 21 of the service control node 20. The call service identification information ID is sent to the service switching node 10 side through the signaling network 3.

At <3>, the service switching node 10 receiving that information ID records this therein.

At <4>, in the registration of <3>, the registration table 16 of FIG. 5 is used. Note that, this registration table 16 is drawn at the position of the subscriber terminal 4, but in actuality exists in the service switching node 10. Concretely, it is recorded in the main memory in the call processor (38 of FIG. 3).

Also, FIG. 5 shows an example wherein the information ID registered in this registration table 16 is composed by a call service identification number and a call service identification character code, wherein F in the figure indicates a flag. When a valid ID Is registered, F becomes equal to "1".

At <5>, when the calling subscriber originates a call, a terminal 4 is changed from an on-hook to an off-hook state. Then, assume that a request is made for a credit card calling service. At this time, an access code instructing this credit card calling service is dialed. A dial number in accordance with this dialing is sent to the service switching node 10 via the subscriber line (not illustrated).

The service switching node 10 receiving this dial number translates the dial number and learns that there is a request for a credit card calling service. The service switching node 10 demands that it be supplied with the call control instruction (CCI) corresponding to this credit card calling service from the service control node 20.

At <6>, the service control node 20 receives the access code from the service switching node 10 and performs the analysis thereof.

At <7>, the means 21 of the service control node 20 learns by the above analysis that the related call requests the credit card calling service.

Figure 8:
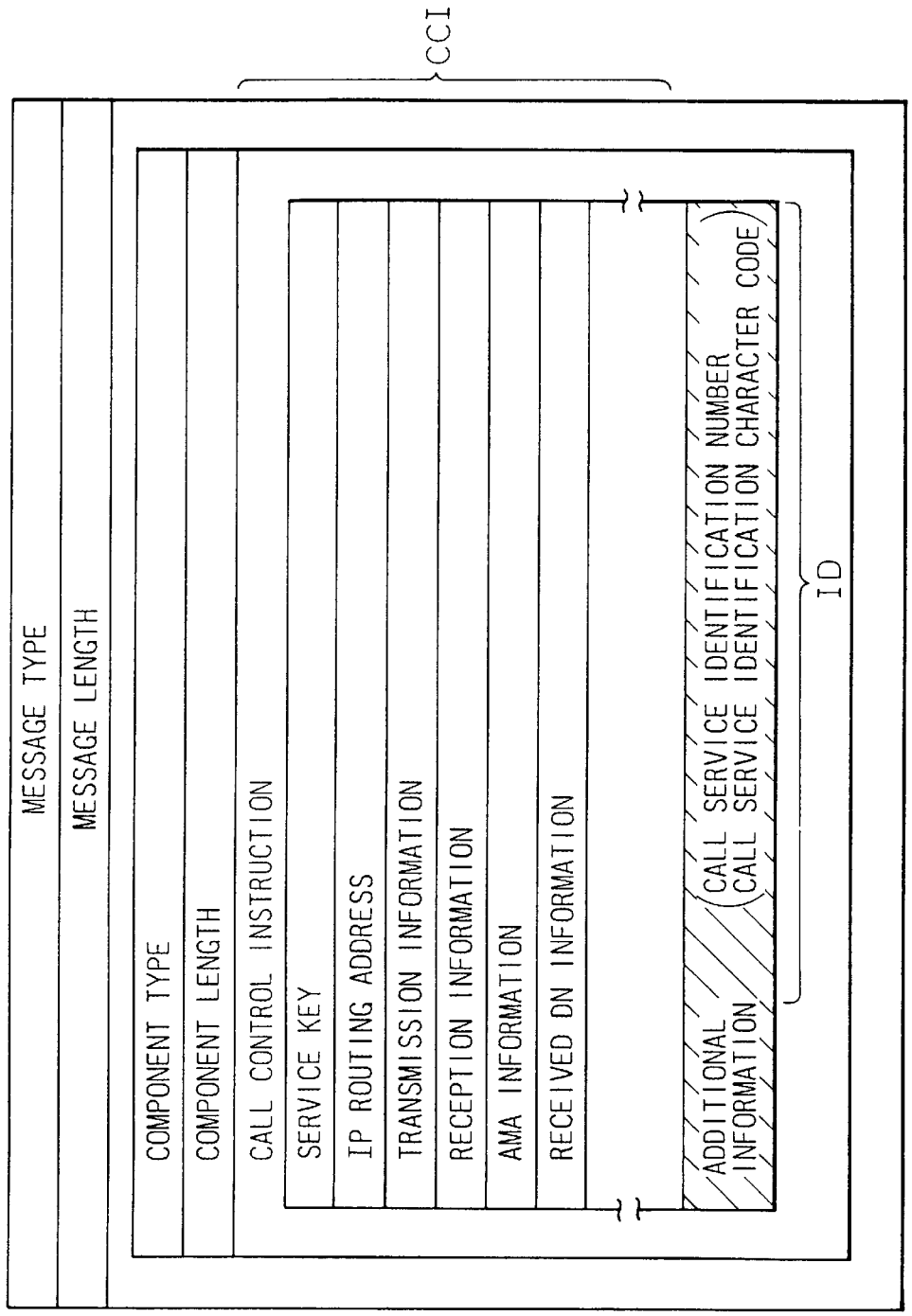
FIG. 8 is a view showing an example of the data format of a call control instruction shown in FIG. 4.

The service control node 20 transfers the call service identification information ID representing the credit card calling service as additional information in addition to a usual call control instruction (one example is shown in FIG. 8 as will be mentioned later).

At <8>, the service switching node 10 receiving the above call service identification information ID holds the transferred identification information ID by the means 11. This can be held in the call control memory (not illustrated) in the call processor 38 as already mentioned.

At <9>, when the holding of the identification information ID of <8> ends, the service switching node 10 enters the usual connection operation of speech paths and the inherent communication is started.

Next, the explanation shifts to FIG. 5.

At <10>, when the communication ends, the disconnection of communication is sent to the service switching node 10 by the on-hook state at the subscriber terminal 4 and the speech path is released.

At <11>, upon receipt of the end of the call at the above <10>, the service switching node 10 compares the identification information ID corresponding to the credit card calling service provided to the related call which has been held in the holding means 11 and the identification information ID recorded in the registration table 16 by the means 12.

In the case of the above example, the credit card calling service requested by the calling subscriber (4) has been already recorded in the registration table 16, and the result of comparison by the means 12 is a match.

Due to this match, the service switching node 10 learns that the call which ends at this time is an object of the collection of the traffic data and then transfers the processing to the means 14.

At <12>, the means 14 of the service switching node 10 executes the collection of the traffic data (for the related credit card calling service) and processing of the same. The processing referred to here means that a decision is made as to if a similar service has been already provided by the calling subscriber and, if it has been already provided, the traffic data is cumulatively added, and so on. Note that the result of this collection of traffic data is accumulated.

At <13>, on the other hand, the service control node 20 issues an instruction for requesting transfer of the traffic data for reading the result of the collection of the traffic data from the service switching node 10 using the means 23. At this time, it is specified for what call service the transfer request of the traffic data should be carried out. For this specification, the identification information ID is used again.

At <14>, the service switching node 10 receiving the identification information ID for the above specification compares the two IDs to check whether or not this ID is the ID recorded in the registration table 16 by the means 13. When the result of this comparison is a match, the service switching node 10 learns that the traffic data for the call service corresponding to the related ID is collected and takes out the traffic data from the registration table 16.

At <15>, the service switching node 10 transfers the taken out traffic data as additional information at the time of the transmission of traffic information to the service control node 20 by the means 15. Note that, it is also possible if the traffic data is transferred alone, not as additional information, to the service control node 20.

At <16>, the service control node 20 performs an accumulation processing for the transferred traffic data.

At <17>, the traffic data of <15> is given also to the central maintenance operation center 6 according to need. In this case, the accumulation processing for the traffic data is carried out in the central maintenance operation center 6.

Figure 6:
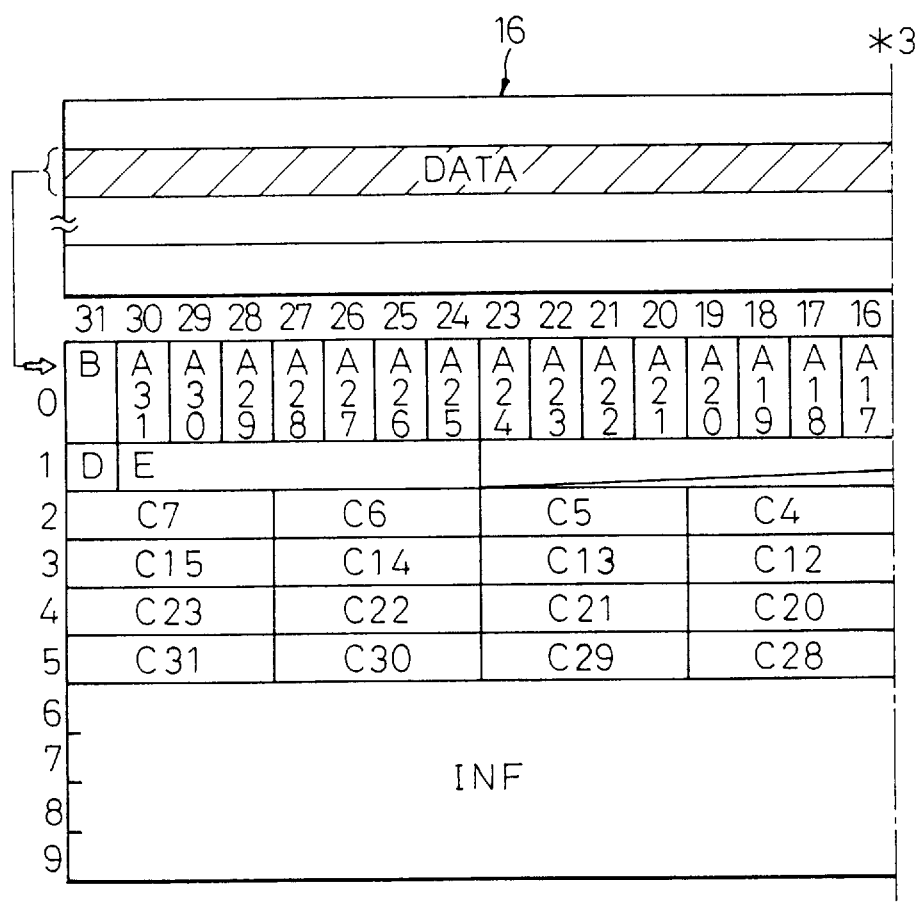
FIG. 6 is a first part of a view showing a detailed example of a registration table 16.
Figure 7:
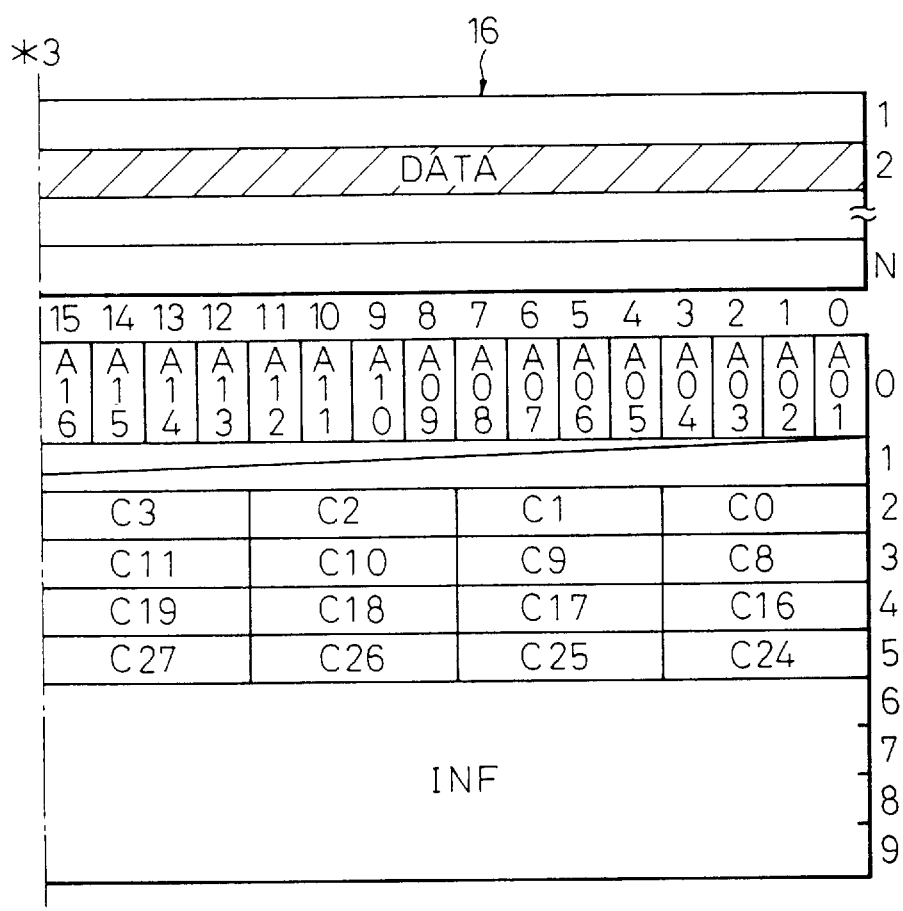
FIG. 7 is a second part of a view showing a detailed example of a registration table 16.

FIG. 6 is a first part of a view showing a detailed example of the registration table 16, while FIG. 7 is a second part of that view. At the top section of the two figures, the registration table 16 is shown. It is comprised of the columns 1, 2, ..., N. The data format is the same for all of the columns. One of them is taken out and shown in the lower sections of the two figures.

Referring to the lower sections of the two figures, the meanings of the symbols are as follows:

i) A01 to A30: Registered information of types of calls for which call services are available (maximum 31 types of calls for which call services are available may be registered)

A01: Intra-office connection
A02: DOD origination (DOD: Direct Out Dial)
A03: DID termination (DID: Direct In Dial)
A04: MLH connection (MLH: Multi Line Hunting)
.
.
.

ii) B (Same as F of FIG. 5): Call for which call services are available is registered (="1") or not so registered (="0")

iii) C0 to C23: Character code of a call for which call services are available (maximum 32 characters can be registered)

iv) D: Character code of call for which call services is available is registered (="1") or not registered (="0")

v) E: Number of the digit of characters in character code of call for which call services are available vi) INF: Traffic information The "credit card calling service" of the above example is indicated by writing "1" in for example a region A05. Also, in the character code regions C0, C1, C2, ..., for example, C0=C, C1=R, C2=E, C3=D, ... is recorded to indicate the 17 characters of "CREDIT CALL SERVICE" as a whole.

The traffic information INF also contains traffic data concerning for example the credit card calling service aimed at by the present invention.

FIG. 8 is a view showing an example of the data format of the call control instruction (CCI) shown in FIG. 4. The call control instruction (CCI) shown in FIG. 4 is transferred in the signaling network 3 with the data format shown in the figure. The call control instruction is formed in the region CCI of the figure. The call service identification information ID is included in this region as additional information.

Note that, in the figure, the "service key" is for example the credit card calling service; the "IP routing address" is for example an access code of an announcement equipment ANE; the "transmission information" is for example an answer message (ANM); and the reception information is for example an in-band digit or account No. Note that, "in-band digit" is the numerical information necessary when making an announcement to the calling party in the service switching node 10; "account No." is accounting information; and "AMA" is automatic message accounting information.

FIG. 9 is a first part of a view showing an example of the data format of the signal transferred on F1 of FIG. 4, while FIG. 10 is second part of the view. The traffic data collection instruction (traffic info. 1) shown in the two figures is data which should be recorded in the registration table 16 and accordingly the same as the contents of the lower sections (columns 0 to 5) of FIG. 6 and FIG. 7 mentioned before. Note, the flag B at the left top of the lower section of FIG. 6 is so-called "don't care" (meaningless) information in FIG. 9. This is because the flag B is useful only for processing of the service switching node 10 per se.

Figure 11:
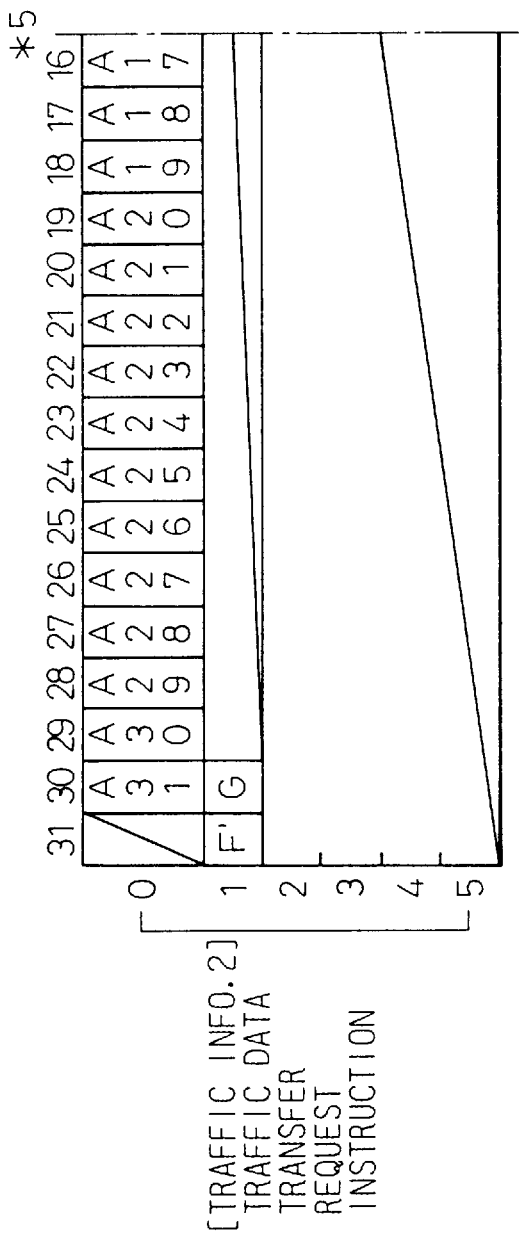
FIG. 11 is a first part of a view showing an example of the data format of a signal transferred on F2 of FIG. 5.
Figure 12:
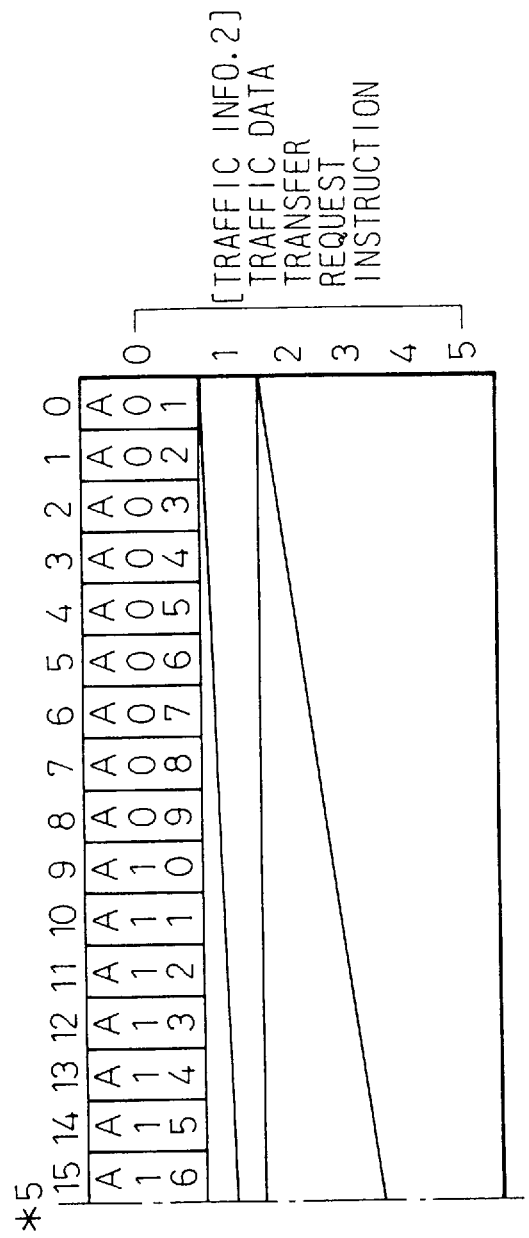
FIG. 12 is a second part of a view showing an example of the data format of a signal transferred on F2 of FIG. 5.

FIG. 11 is a first part of a view showing an example of the data format of the signal transferred on F2 of FIG. 5, while FIG. 12 is a second part of that view. The traffic data transfer request instruction (traffic info. 2) shown in the two figures is an instruction that the result of the collection of the traffic data should be transferred to the service control node 20 or the central maintenance operation center 6 by the service control node 20 to the service switching node 10. Note that, in the two figures, the regions with the diagonal lines are not used. If a variable length data format is adopted, the region of the character code of the columns 2 to 5 can be omitted.

A flag F' shown in FIG. 11 shows that the result of the collection of the traffic data must be transferred to the service control node 20, and a flag G shows that it must be transferred to the central maintenance operation center 6. There is no problem if a request that the result of the collection of traffic data be transferred to both of them (20, 6) is issued.

Figure 13:
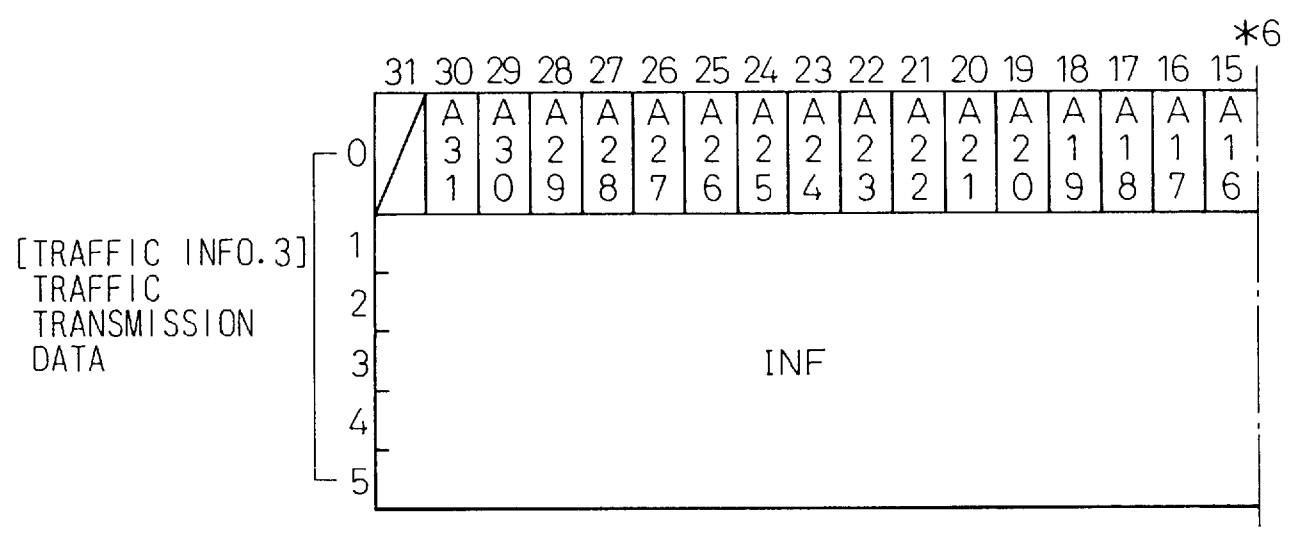
Figure 14:
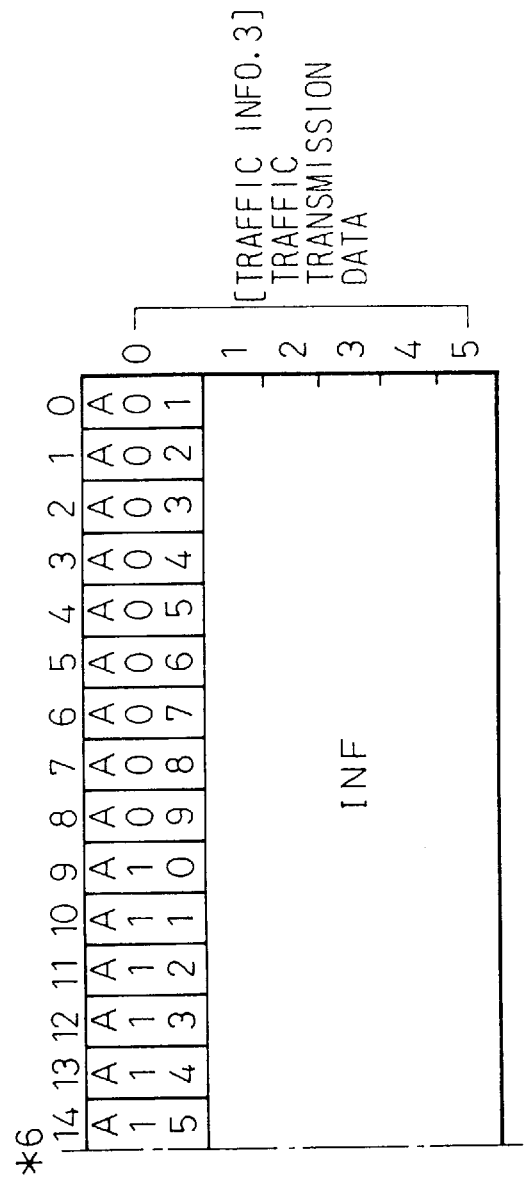
FIG. 14 is a second part of a view showing an example of the data format of a signal transferred on F3 of FIG. 5.

FIG. 13 is a first part of a view showing an example of the data format of a signal transferred on F3 of FIG. 5, while FIG. 14 is a second part of that view. The traffic transmission data (traffic info. 3) shown in the two figures is in response to the traffic data transfer request of FIG. 11 and FIG. 12. The desired traffic data is included in the traffic information INF and transferred to the service switching node 10 or central maintenance operation center 6.

Figure 15:
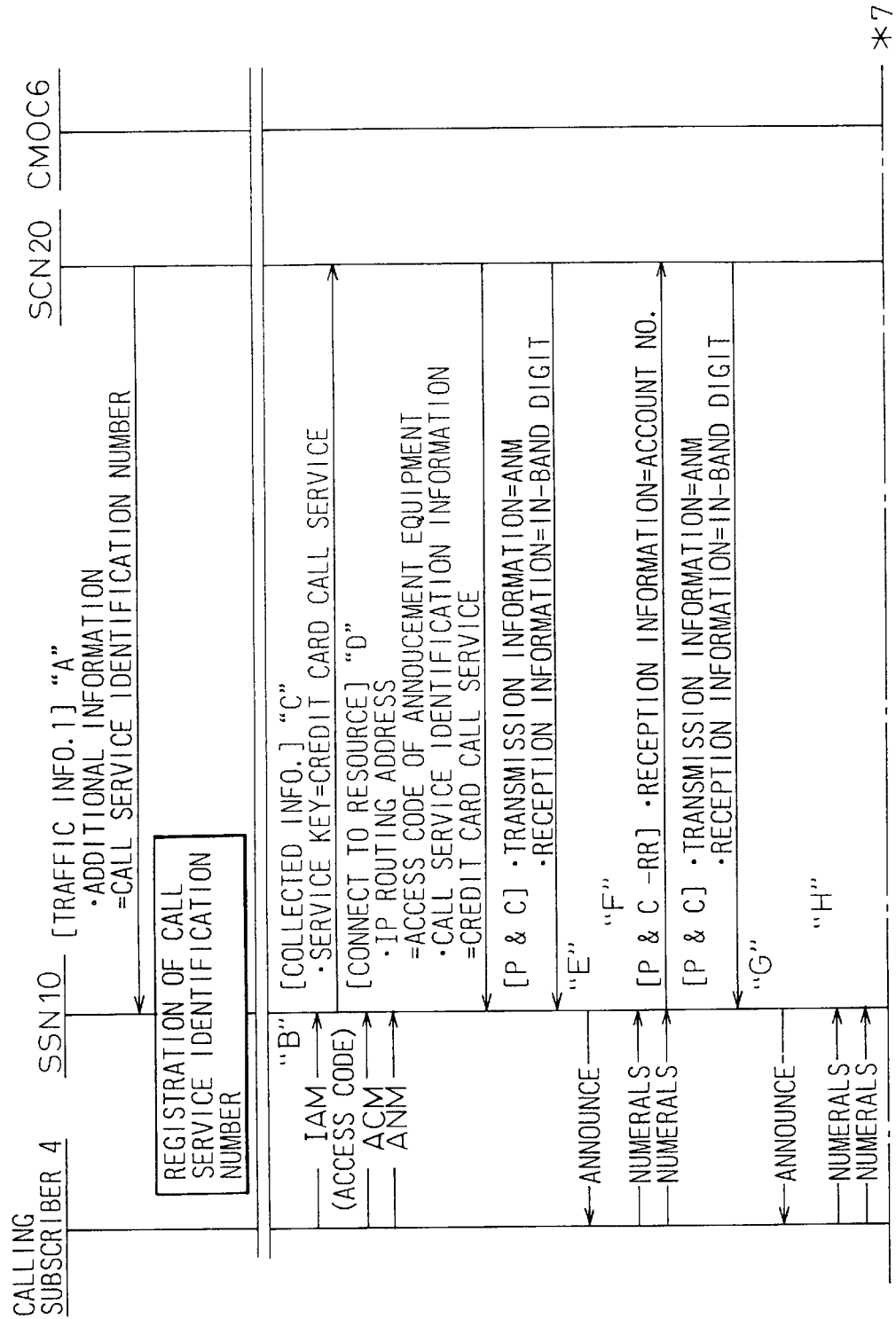
FIG. 15 is a first part of a view showing the sequence of the operation in a communication network at the time of a provision of a credit card calling service.
Figure 16:
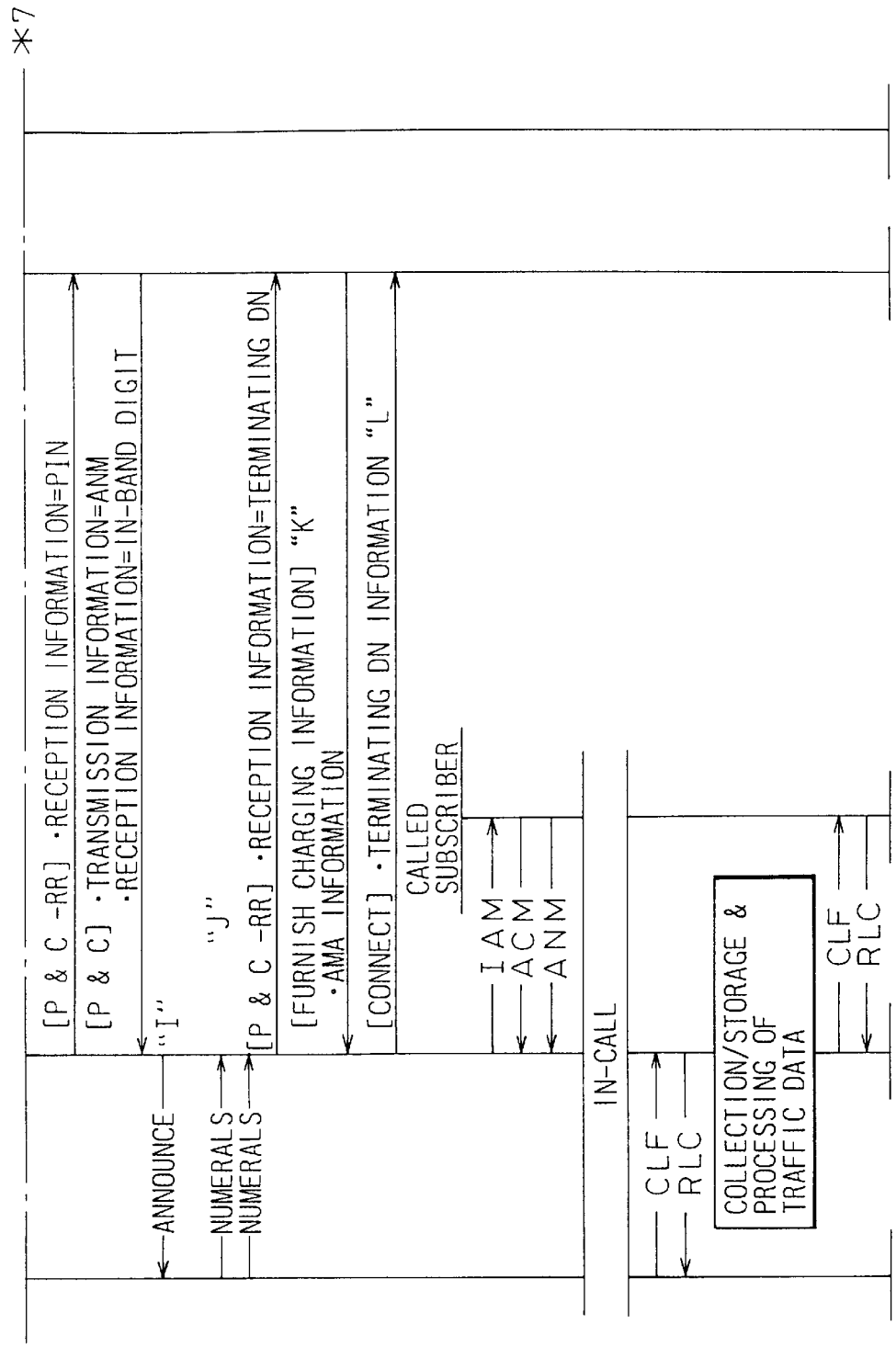
FIG. 16 is a second part of a view showing the sequence of the operation in a communication network at the time of a provision of a credit card calling service.

FIG. 15 is a first part of a view showing the sequence of operations in the communication network at the time of the provision of a credit card calling service, while FIG. 16 is a second part of that view. The credit card calling service enables calls to be not charged to the calling terminal (4), but charged to a credit card number specified at the time of the call, as mentioned above.

The service control node 20, when a new calling service is introduced, transmits a call service identification number allotted to that calling service to the service switching node 10 by a message "A" (FIG. 15), which notifies the service switching node 10 that the new call service is added and that collection of traffic data for the new calling service is requested.

The service switching node 10 records the call service identification number of the new call service received by "A" in the registration table (call service identification number registration table) 16.

When the calling party inputs a service access code "B" for a credit card call from the terminal 4 thereof, the service switching node 10 receives this, recognizes that the call is an intelligent network service call, and transmits a message "C" to the service control node 20 via the No. 7 signaling network 3. Due to this, the service control node 20 is notified of the telephone number of the terminal 4 and the fact that there is a request of utilizing the service.

When receiving the notification, the service control node 20 transmits a message "D" for connecting the terminal 4 and the announcement device (ANE) 37 to the service switching node 10. This is carried out for outputting a voice message from the announcement device (ANE) 37 to the calling party.

Subsequently, the service control node 20 receives the credit card number from the calling party and sends to the service switching node 10 a message "E" instructing that the credit card number should be transferred to the service control node 20. Due to this, the service switching node 10 controls the announcement device 37 and sends a message prompting the calling party (4) by voice to input the credit card number.

When receiving the digit of the credit card number from the calling party, the service switching node 10 sends a message "F" to the service control node 20.

Subsequently, the service control node 20 receives the PIN number from the calling party and sends to the service switching node 10 a message "G" instructing that it should be transferred to the service control node 20. Due to this, the service switching node 10 controls the announcement device 37 and sends a voice message prompting the calling party to input the PIN number.

When receiving the digit of the PIN number from the calling party, the service switching node 10 sends a message "H" to the service control node 20.

Subsequently, the service control node 20 receives the destination number from the calling party and sends to the service switching node 10 a message "I" instructing that it should be transferred to the service control node 20. By this, the service switching node 10 controls the announcement device 37 and sends a voice message prompting the calling party to input the destination number.

When receiving the digit of the destination number from the calling party, the service switching node 10 sends a message "J" to the service control node 20.

Thereafter, the service control node 20 instructs the preparation of detailed accounting information to the service switching node 10 by a message "K".

Subsequently, the service control node 20 transmits a message "L" to the service switching node 10 to instruct it to connect the calling party to the destination telephone number (destination DN). By this, the service switching node 10 calls up the terminating subscriber (terminating terminal) specified by the destination telephone number and, if there is a response, connect the originating terminal and the terminating terminal to enable the start of the conversation. When the conversation ends and the telephone is hung up (on-hook), the terminal 4 sends a release message CLF to the service switching node 10 and the service switching node 10 performs the disconnection processing and transmits a release complete message RLC to the terminal.

Thereafter, the service switching node 10 carries out the processing for collection and accumulation of the traffic data according to the present invention and sends a release message CLF to the terminating terminal. The terminating terminal performs the disconnection processing and transmits the release complete message RLC to the service switching node 10 to end the provision of the credit card calling service.

Note that the meanings of the symbols used in FIG. 15 and FIG. 16 are as follows.

IAM is an initial address message.

This is one of the messages of TUP/ISUP, i.e., the user part of the No. 7 signaling system and is a message for transmitting the called telephone number or calling telephone number to an opposing office.

TUP is a telephone user part, and ISUP is an integrated services digital network user part.

ACM is an address completion message.

This is one of the messages of TUP/ISUP, i.e., the user part of the No. 7 signaling system and is a reception completion message of the called telephone number or calling telephone number using the IAM.

CLF is a clear forward message.

This is one of the messages of TUP/ISUP, i.e., the user part of the No. 7 signaling system and is a disconnection message sent from the calling side.

RLC is a release call message.

This is one of the messages of TUP/ISUP, i.e., the user part of the No. 7 signaling system and is a call finish message transmitted from the called side.

P & C is prompt and collect user information.

This is the name of the message for sending the instruction for the call control operation from the service control node to the service switching node direction for executing a credit card calling service in an AIN (advanced intelligent network).

P & C - RR is a prompt and collect user information return-result.

This is the name of the response message with respect to a P & C from a service switching node to the service control node direction for executing the credit card calling service in an AIN.

PIN is a personal identification number.

This is the PIN number of the credit card used when executing the credit card calling service.

Figure 17:
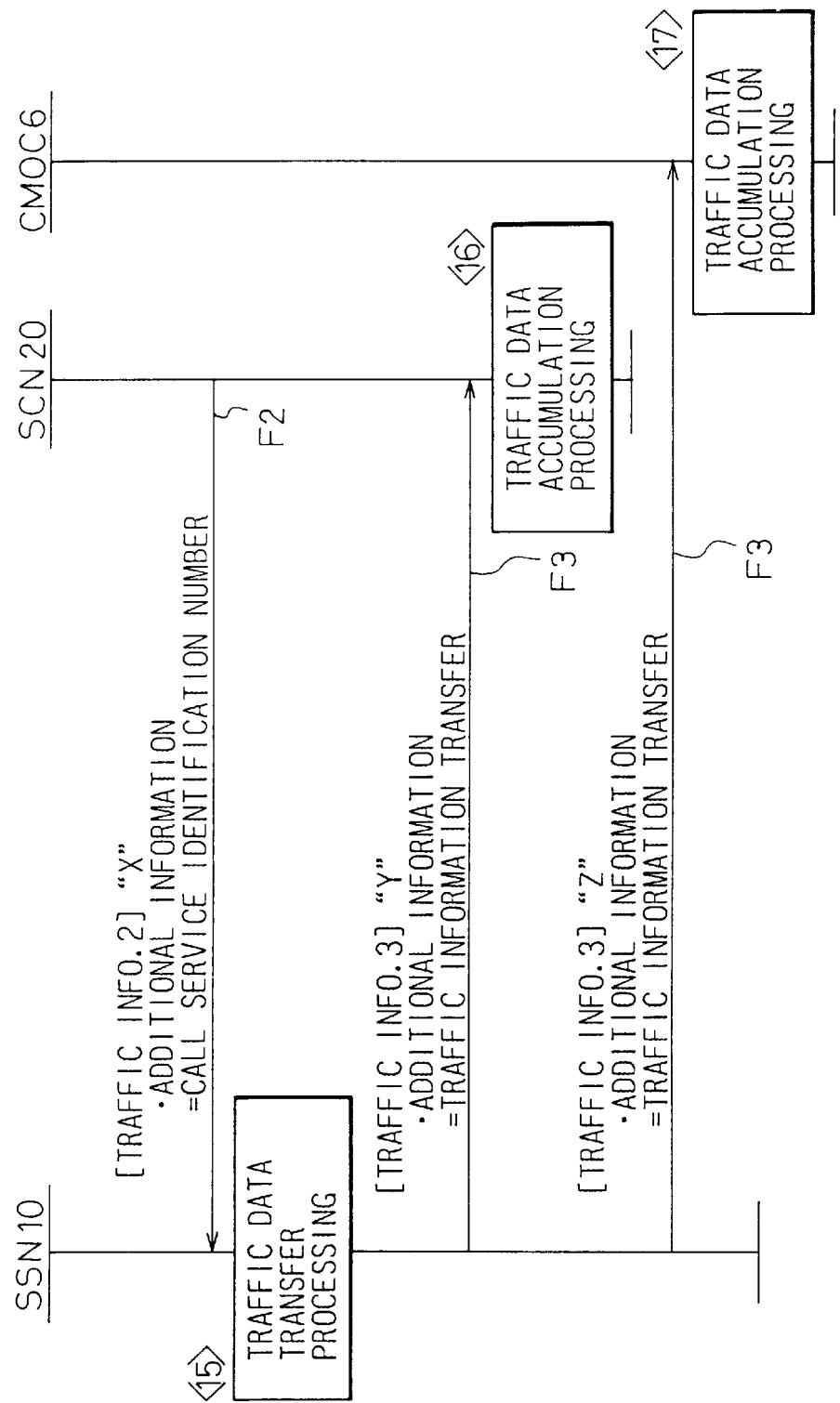
FIG. 17 is a view showing the sequence of the operation for transfer of traffic information.

FIG. 17 is a view showing the sequence of operation of the transfer of traffic information. The sequence of operation of the figure shows the reception and transmission of a signal at the parts <15>, <16>, and <17> in FIG. 5.

The service control node 20, by transmitting the call service identification number to the service switching node 10 by a message "X" (traffic info. 2 of FIG. 11 and FIG. 12), sends the request for transfer of traffic data of the new call service to the service switching node 10.

The service switching node 10 searches through the registration table (call service identification number registration table) 16 using the call service identification number received by the message "X" and then, if there is a registration, transmits the collected traffic information (INF) to the service control node 20 or the central maintenance operation center 6.

Subsequently, the service control node 20 or the central maintenance operation center 6 receives the traffic information "Y" or "Z" (traffic info. 3 of FIG. 13 and FIG. 14) and stores and accumulates it in the database (43, 46).

As explained in detail above, according to the present invention, in an intelligent network communication network having at least a service switching node (SSN) and a service control node (SCN) provided with intelligent network (IN) functions, when an intelligent network service is newly introduced, it is sufficient if the service control node (SCN) additionally perform the procedure of assigning call service identification information to the new intelligent network service and notifying this to the service switching node (SSN) in addition to altering the program corresponding to the related new intelligent network service.

On the other hand, it is sufficient if the service switching node (SSN) receiving that call service identification information merely record this in the registration table, that is, there is no need for altering and adding the programs in the service switching node (SSN) for coping with the new intelligent network service. It is sufficient so far as, when a request for a call service is issued from the calling party, it is searched if this call service coincides with a call service registered in the registration table, and if it coincides, at the time of the end of the related call, the intended traffic data collection and processing are carried out for the call service provided for the related call.

I claim:

1. A service control node constituting part of a communication network having intelligent network functions and performing collection of traffic data, concerning usage of call services said service control node provided with:

an identification information assigning means for assigning call service identification information to each of a variety of call services provided in said communication network and an identification information notifying means for sending said call service identification information corresponding to a call service regarding a request for collection of traffic data to said service switching node when such a request is generated from the service switching node constituting said communication network and starting the processing for collection of traffic data.

2. A service switching node constituting part of a communication network having intelligent network functions and performing collection of traffic data, said service switching node provided with:

an identification information holding means for receiving the call service identification information assigned to each of a variety of call services provided in said communication network from the service control node constituting part of said communication network for each call and temporarily holding the same;

a registration table for registering in advance said variety of call services paired with said call service identification information; and a first comparing means for comparing said call service identification information held in said identification information holding means and said call service identification information registered in said registration table at the time of the end of said call and performing the collection of the traffic data when the result of comparison is a match.

3. A service switching node performing the collection of traffic data as set forth in claim 2, wherein said service switching node has a collection processing means which is started when the result of comparison by said first comparing means is a match and performs said collection of traffic data for said call service for the related match.

4. A service control node performing the collection of traffic data as set forth in claim 1, wherein said service control node has a transfer request instruction means for sending a transfer request instruction for transferring the result of said collection of traffic data executed at said service switching node from said service switching node together with said call service identification information specifying the call service regarding the related collection of traffic data to said service switching node.

5. A service switching node performing the collection of traffic data as set forth in claim 3, wherein provision is made of a second comparing means for comparing the sent call service identification information and said call service identification information registered in said registration table when the transfer request instruction instructing that the result of said collection of traffic data executed by said collection processing means be transferred to said service control node is sent together with said call service identification information specifying the call service regarding the related traffic data collection; and a traffic data transfer means which is started when the result of comparison by said second comparing means is a match and transfers the result of said collection of traffic data by said collection processing means for said call service regarding the related match to said service control node.

6. A service switching node performing the collection of traffic data as set forth in claim 5, wherein said traffic data transfer means transfers the result of said collection of traffic data together with said call service identification information to a central maintenance operation center constituting part of said communication network.

7. A service control node performing the collection of traffic data as set forth in claim 1, wherein said call service identification information to be transferred from said service control node to said service switching node is transferred while being contained as additional information in the call control instruction to be transferred for instructing the call control by said service control node to said service switching node.

8. A service control node performing the collection of traffic data as set forth in claim 1, wherein said call service identification information is composed by a call service identification number for identifying the call service.

9. A service control node performing the collection of traffic data as set forth in claim 1, wherein said call service identification information is composed by:

said call service identification number and a call service identification character code for providing the classification of said call service as character information on an information display means in said service switching node.

10. A service control node performing the collection of traffic data as set forth in claim 1, wherein said call service identification information is transferred from said service control node via a No. 7 common signaling network.

11. A service switching node performing the collection of traffic data as set forth in claim 5, wherein said call service identification information is transferred from said service switching node via a No. 7 common signaling network.

12. A service control node performing the collection of traffic data as set forth in claim 1, wherein said call service identification information is transferred from said service control node via a signaling network in which a predetermined communication protocol is set.

13. A service switching node performing the collection of traffic data as set forth in claim 5, wherein said call service identification information is transferred from said service switching node via the signaling network in which a predetermined communication protocol is set.

* * * * *